E0152 XR 3,058,065

(1)

Oct. 9, 1962 R. L. FREEMAN ET AL 3,058,065

SYSTEM FOR DETERMINING LISTENING HABITS OF WAVE SIGNAL RECEIVER USERS

Filed Nov. 7, 1956 2 Sheets-Sheet 1

This system is distinct from the Program channels

Remote Recording

Program I D
Subscriber I D

INVENTORS
ROBERT L. FREEMAN AND
CHARLES H. CURREY
BY
Mason, Kolehmainen, Rathburn and Wyss.
ATTORNEYS INVENTORS
ROBERT L. FREEMAN AND
CHARLES H. CURREY
BY
Mason, Kolehmainen, Rathburn and Wyss
ATTORNEYS United States Patent Office
3,058,065
Patented Oct. 9, 1962

3,058,065

SYSTEM FOR DETERMINING LISTENING HABITS OF WAVE SIGNAL RECEIVER USERS

Robert L. Freeman, Glenview, and Charles H. Currey, Palatine, Ill., assignors to A. C. Nielsen Company, a corporation of Delaware Filed Nov. 7, 1956, Ser. No. 620,933
1 Claim. (Cl. 325—31)

The present invention relates to wave signal receiver monitoring systems, and more particularly to an improved system for monitoring, from a remote location, a plurality of wave signal receivers to determine the extent of use of each receiver and, moreover, to determine the particular transmitting station from which program signals are received and translated by each receiver. In particular, therefore, the improved system of the present invention is well adapted to use in ascertaining the listening and/or viewing habits of wave signal receiver users.

Generally speaking, the effectiveness of a particular program as an advertising media is directly related to the average size of the listening audience, the average period of listening to a particular program, i.e., the "holding" power of the program, and the variations in the size of the listening audience on a periodic basis.

The periodic variations in the audience are indicative of the program components which cause audience gains or losses, the types of commercial messages which cause audience losses, and the optimum location of commercial messages during the program.

In addition to the above factors, it is desirable to provide a program survey organization with the following information or ratings:

(1) *Cumulative Audience* which is the total number of different homes listening to one or more of four successive broadcasts of a weekly program.

(2) *Program Duplication* which is the extent to which programs of the same sponsor reach different audiences.

(3) *Audience Flow* which is the proportion of a programmed audience which was gained from people initially turning on or retuning their receivers from specified other programs.

(4) *Program Audience by Market Positions* which is a tabulation of the audience of specified programs in accordance with census groupings, such as, for example, geographic locations, family income, religion, etc.

Unfortunately, considerable time is required to compute the above four ratings and since it is frequently desirable to know the effectiveness of a particular program within a very short time after the termination of that program, certain other information or ratings, while less detailed than the above factors, are both useful and necessary. These latter types of analytical information are generally known in the art as fast ratings and are usually expressed as percentages. These ratings for television monitoring, for example, are three in number, and are as follows:

(1) Number of homes using TV.
(2) Average audience for a particular program.
(3) Share of audience for a particular program.

One of the first attempts to monitor home receivers utilized the so-called "telephone-call method" which involves the making of hundreds of personal telephone calls to random selected homes during the period when the particular program of interest is in progress and statistically analyzing the results of these telephone calls to determine the extent of listening. Although the information obtained by such a method is better than no information at all, because of its many inherent defects, which include the uncontrolled uncertainties which are introduced by human judgment, the accuracy of the results so obtained tends to be destroyed. In fact, it is entirely impossible to obtain any useful information concerning most of the factors given above when the telephone-call method of monitoring is used.

Because both the networks and so-called sponsors of radio and television programs are desirous of obtaining accurate information as to the relative effectiveness of the programs with which they are associated, more accurate instrumented methods of sampling which do not require active audience collaboration have been necessarily resorted to so as to provide more information than is accumulated by the telephone-call sampling technique and, moreover, entirely to eliminate errors of human judgment associated with the personal contact types of sampling methods.

The instrumented methods or systems for monitoring receivers are in general of two types: the first utilizes a plurality of recorders, respectively located at a plurality of receivers to be monitored, and the second utilizes a single recorder remotely located with respect to the receivers to be monitored and to which information is automatically transmitted, either periodically or continuously from each monitored receiver. With both types the information so accumulated at the recorders is later passed on to the program survey organization for the computation of the above factors. The present invention is particularly concerned with the latter type system since such a system lends itself to producing fast ratings which may be made available a short time after the termination of a program, and it also provides the necessary information to enable the tabulation and computation of the more detailed ratings.

One monitoring system of this latter type is disclosed in a copending application, Serial No. 572,159, filed March 16, 1956, in the names of Rahmel, Freeman, Currey and Holbrook, now Patent No. 2,833,859. In that system, leased telephone lines are employed for continuously connecting each of a plurality of monitored receivers or homes to a central office in which a recorder and other tabulating equipment is located. Although such a system reliably provides all of the information necessary for the computation of the more detailed ratings and at the same time provides fast ratings, it would be desirable to eliminate the use of telephone lines for connecting the homes to the central office since the cost of such lines is relatively expensive. Moreover, in order to reduce the cost of the necessary equipment in the system as well as to reduce the maintenance cost thereof, it would be desirable to provide a system in which information is periodically rather than continuously communicated from the individual homes to the central office. This information must, however, be supplied from each home to the central office at least once each minute so as to enable the computation of the fast ratings.

Therefore, a principal object of the present invention is to provide a new and improved method and apparatus for monitoring the listening habits of wave signal receiver users.

Another object of the present invention is to provide a new and improved monitoring system in which information is periodically communicated from each of a plurality of homes to a central office including means for providing fast ratings and means for accumulating the more detailed information concerning each of the homes being monitored.

A further object of the present invention is to provide a monitoring system which provides at a central office both fast ratings and detailed information concerning the operating condition, on a minute-to-minute basis, of each of the receivers in a selected sample.

Briefly, the above and further objects are realized in accordance with this invention by providing a new and improved transpondor type of monitoring system in which interrogation signals are periodically transmitted from a central office to transpondor units located in each of the homes in a preselected sample. Following each interrogation signal, the transpondors sequentially transmit to the central office signals which identify each responding unit and indicate the operating condition of each receiver associated with that unit. Tabulation and recording equipment at the central office may then provide an up-to-the-minute "fast rating" of each program receivable in the area of the sample and a log of the minute-to-minute operating condition of each receiver in the sample.

Further objects and advantages and a better understanding of this invention may be had by reference to the following detailed description and to the drawings, in which.

Figure 1:
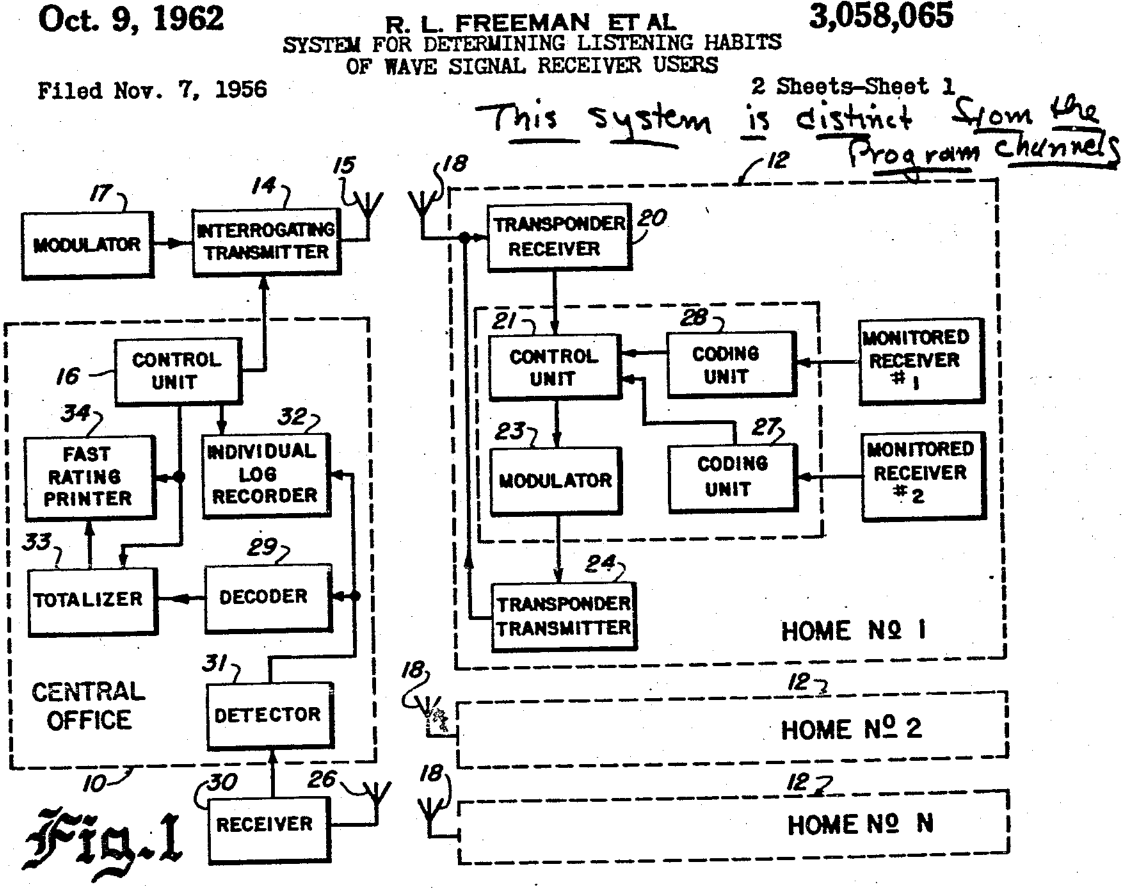
FIG. 1 is a block diagram of the overall system of the present invention.

Referring now to the drawings and particularly to FIG. 1 thereof, there is shown a central office 10 which accumulates receiver operating condition information from a plurality of remotely located homes 12 so as to enable a program survey organization to make the necessary ratings which indicate the effectiveness of radio and television programs. Associated with the central office 10 is an interrogating transmitter 14 which periodically drives an antenna system 15 in response to periodic keying signals from a control unit 16 at the central office 10, thereby to transmit, through the atmosphere, periodic interrogation pulses having frequency components determined by a modulator 17. The interrogating pulses may, for example, occur at the rate of one per minute and have a width of 0.25 second. The interrogation pulses are received by each of a plurality of antenna systems 18 which are respectively associated with each of the homes in the sample under investigation and are selected and amplified in a suitable transpondor receiver 20 provided at each home so as to provide a control signal which is supplied to a control unit 21 for controlling the operation of a modulator 23 and a transpondor transmitter 24. The receiver 20, control unit 21, modulator 23 and transmitter 24 thus constitute a transpondor which answers back to the central office 10 by transmitting a coded signal during a short predetermined time interval following the reception of each interrogation pulse. In a described embodiment of this invention, each answering signal has a duration of approximately 0.25 second.

In order to facilitate identification of the particular receivers to which the answering signals are respectively pertinent, the answering signals from each of the homes 12 are transmitted during time intervals which are unique for each receiver in the sample. For example, in home No. 1, which includes two monitored receivers, the transmitter 24 drives the antenna 18 during two unique time intervals, one for each of the receivers, these intervals being different from the intervals for every other receiver in the sample. Accordingly, the time delay which occurs between transmission of the interrogation pulse from the antenna system 15 and the reception of the answering-back pulses by a receiving antenna system 26 identifies the particular monitored receiver whose answering-back signal is being received.

In order to include in each answering-back signal an indication of the operating condition of the associated receiver, the transmitter 24 is modulated by a plurality of voltages of different selected frequencies so that the answering-back signal comprises a plurality of frequency components, which components indicate the operating condition of the receiver.

To this end there is provided for each receiver in the sample a coding unit which is operatively connected to the monitored receiver and which respectively provides a binary coded output signal indicative of the operating condition of the associated receiver. The coding units, designated 27 and 28, are preferably of the type disclosed in copending application, Serial No. 381,344, filed September 21, 1953, in the name of Charles H. Currey, now Patent No. 2,881,417. Such a coding unit provides an output signal having a minimum number of components for indicating the condition of tuning and the condition of energization of the associated receiver. The combination of both of these conditions is referred to hereinafter as the operating condition. The binary coded signals from the units 27 and 28 are supplied to the control unit 21 wherein is provided means which, in association with the modulator 23, causes a plurality of frequency components equal in number to the components of the binary coded signal from one of the units 27, 28 to be modulated on the signal which is transmitted from the antenna system 18. It will be apparent that at any one time the signal transmitted by the antenna 18 contains frequency components corresponding to the output signal from only one of the coding units 27, 28.

When the answering-back signals from each of the homes 12 are received by the central office receiving antenna system 26, they are supplied to a suitable receiver 30 which selects and amplifies the received signals and supplies them to a detector 31 which provides a binary output signal of voltage corresponding to that which was modulated on the answering-back signal from the receiver in question. This binary signal of voltage is coupled both to an individual log recorder 32 and to a decoder 29 which converts the binary coded signal into a decimal indication of receiver operating condition and supplies such information to a totalizer 33. The totalizer 33 accumulates all of the information which is received during a predetermined time interval, all receivers of a particular type in the sample answering-back during that interval, and supplies certain totals to a fast rating printer 34. At the end of each of said time intervals, a print order signal from the control unit 16 is supplied to the printer 34, which then prints the totals supplied thereto from the totalizer 33. At the completion of the printing operation a reset signal is supplied to the totalizer 33 to reset it for making the necessary tabulations during the next of said time intervals. It should be noted that in order to provide the fast ratings, these time intervals must occur at least once during each minute. Suitable totalizing and printing equipment for providing fast ratings are described more fully in the above-identified Rahmel et al. application, Serial No. 572,159, now Patent No. 2,833,859.

In order to provide the information needed to compute the more detailed ratings described above, an individual log of the operating condition of each receiver during every minute of the day is made by the individual log recorder 32. These individual logs are correlated with respect to time and the monitored receivers are identified by means of indexing pulses which are supplied from the control unit 16 to the record 32 during transmission of the interrogation pulses. The system of the present invention thus provides at the end of each minute the heretofore described fast ratings and also provides logs of the operating conditions of each receiver in the sample during every minute of the day.

Figure 2:
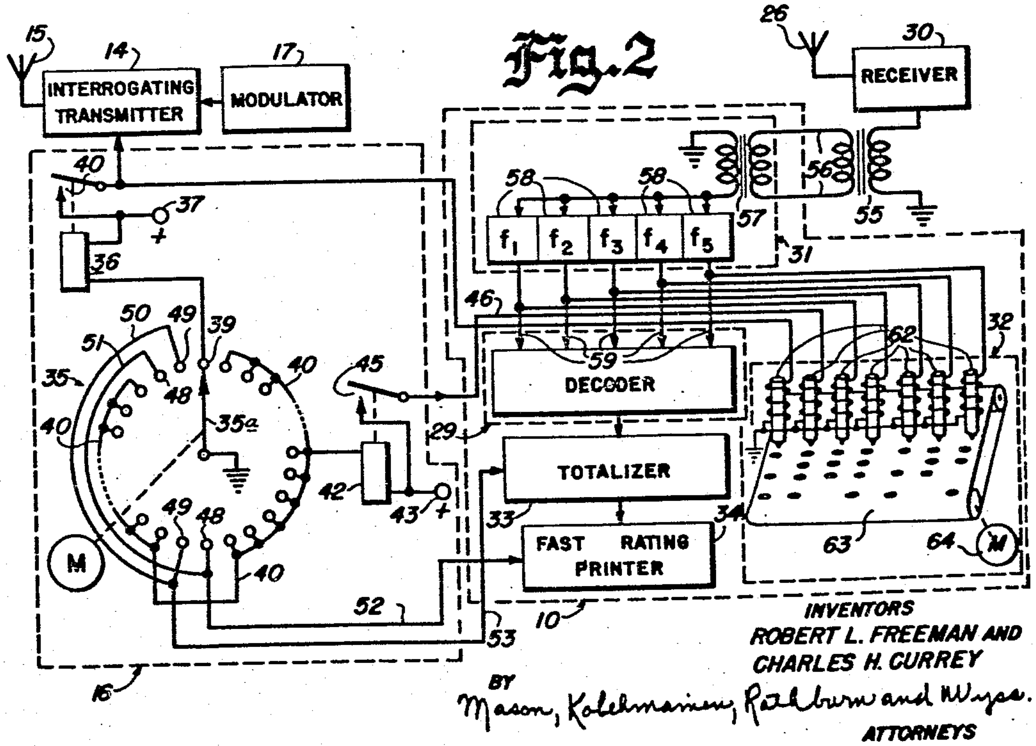
FIG. 2 is a circuit diagram, partially in block diagram form, of the equipment which is provided in the central station or office.

Refer now to FIG. 2 wherein is shown a more detailed circuit diagram of the circuitry and equipment which is associated with the central office 10. The interrogating transmitter 14, which is preferably located near the center of the metropolitan area of the sample under investigation, should be disposed in the highest available building in that immediate vicinity so as to minimize the power requirements thereof. In the illustrated embodiment of the invention, the transmitter 14 may operate at a carrier frequency in the vicinity of 500 megacycles per second and may have an effective radiated peak power of 100 kilowatts. In accordance with the present invention, the transmitter 14 is periodically keyed on by a control signal from the control unit 16 and, in addition, is modulated by means of a fixed frequency signal from the modulator 17. If, for example, the transmitter 14 is keyed on for one-quarter of a second each minute and it is modulated by a signal consisting of pulses from the modulator 17 which turn the carrier on for 10 microseconds and off for 990 microseconds, the transmitter 14 operates on a duty cycle of one part in one hundred during the transmission of the interrogation pulse. If, therefore, the antenna system 15 provides a 10 decibel gain, the transmitter must supply peak power of 10 kilowatts and an average power of 100 watts during the interrogation pulse or an average power over an entire minute of approximately 0.4 watt. The output power requirements of the transmitter 14 are thus relatively low and a reliable transmitter may be provided at a relatively low cost.

In order to key on the transmitter 14 during one-quarter of a second each minute, thereby to leave two hundred thirty-nine other quarter seconds available for the answering-back signals or for control signals, the control unit 16 includes a rotary switch 35 having two hundred forty equally spaced segments (only a portion of which are shown) and a wiper 35a which is rotated at a speed of one revolution per minute by means of a suitable electric motor. The wiper 35a is connected to ground, and the operating coil of a keying relay 36 is serially connected between a source of unidirectional voltage connected to a terminal 37 and the first segment 39 on the switch 35. The voltage provided at the terminal 37 is such that when the segment 39 is grounded through the wiper 35a, the relay 36 is operated thereby to close its normally opened contacts 40 and connect the terminal 37 to the transmitter 14. Consequently, during a period of somewhat less than one-quarter of a second while the wiper 35a dwells on the segment 39, the unidirectional voltage from the terminal 37 is supplied through the closed contacts 40 to the transmitter 14 to key it into operation, thereby to transmit the interrogation signal from the interrogating antenna system 15. The succeeding segments on the switch 35 may thus represent respective receivers in the monitored sample and each serves to indicate a receiver space in the recording equipment as well as a receiver space in time.

In accordance with the present invention, radio receivers are distinguished from television receivers by providing an arrangement wherein the answering-back signals indicative of the operating condition of television receivers are transmitted from the individual homes during a first portion of the overall answering-back period and the radio receiver answering-back signals are transmitted during the remaining portion of the over-all answering-back interval. Assuming, for example, that there are approximately an equal number of television receivers and radio receivers in the sample, the first 118 segments following the segment 39 may correspond to television receivers and a latter group of 117 segments may correspond to radio receivers. Both of these groups of segments are interconnected by means of a conductor 40 and connected through the operating coil of a receiver identification relay 42 to a source of unidirectional voltage connected to a terminal 43. Consequently, during the time that the wiper 35a engages any of these segments which correspond to a receiver, the relay 42 is operated and the voltage from the terminal 43 is supplied through a set of closed contacts 45 on the relay 42 and via a conductor 46 to the individual log recorder 32 thereby to provide a means for indicating in that log the fact that the record position corresponds to a receiver.

In addition to the segments on the switch 35 which are associated with the monitored receivers, there are provided two pairs of segments 48 and 49 which are respectively interconnected by means of conductors 50 and 51 and respectively connected via conductors 52 and 53 to the totalizer 33 and the fast rating printer 34. Therefore, when the first segment of the pair 48 is engaged by the wiper 35a, which segment is located immediately after the group of segments pertaining to television receivers, a print order signal is sent via a conductor 52 to the fast rating printer 34 which then prints the information which has been accumulated and totalized by the totalizer 33 during the preceding half minute. The printer 34 may thus record the total number of television receivers which are energized during the preceding half minute and also the number of television receivers which were tuned to each of the stations being monitored during that half minute.

After the wiper 35a leaves the segment 48 it engages the following segment 49 which thus grounds the conductor 53 to supply a reset signal to the totalizer 33. The totalizer 33 may comprise a plurality of solenoid operated mechanical counters or may comprise a plurality of electronic counting chains of triodes or other suitable devices. The fast rating printer 34 may be a solenoid operated electric typewriter.

After the wiper has engaged each of the segments associated with the radio receivers it again engages one of the pair of reset segments 48 which thus supplies a print order signal to the printer 34 and later engages one of the pair of segments 49 which supplies a reset signal to the totalizer 33.

During each one-fourth of a second interval following the interrogation pulse, an answering-back signal may be received by the antenna 26, the particular one-quarter second intervals in which the answering-back signals are received being indicative of the receivers whose information is then being transmitted to the central office. These answering-back signals are selected and amplified by the receiver 30 and coupled through a transformer 55 to suitable transmission lines 56 for supplying the received signals to the central office 10. If the receiver 30 is not located directly at the central office the transmission lines 56 may, for example, be parts of a coaxial cable. The signal which is supplied over the transmission lines 56 is coupled through a transformer 57 to the detector 31 which comprises a plurality of filter units 58 for separation the various frequency components of the answering-back signal. The separated signals thus provide the binary signal which is supplied on separate ones of a plurality of conductors 59 to the decoder 29 wherein the binary coded signal is converted to a decimal signal for actuation of the totalizer 33.

The detected binary signal which is provided at the outputs of the filter units 58 is coupled to a plurality of input terminals of the individual log recorder 32. This recorder may be of the perforator or reperforator type which includes a plurality of solenoid operated punches 62, which when energized, operate to punch a hole at a particular location on a tape 63. The tape 63 is moved past the punches 62 at a constant speed by a motor 64 so that the position of the marks along the length of the tape is correlated with calendar time and the positions of the punches transversely of the tape 63 indicates the particular punches 62 which were energized at the time the punches were made. In a monitoring system designed for monitoring the specific listening to no more than fifteen stations or channels, a seven punch perforator may be used, the latter five punches 62 being respectively connected to the detector filters 58 to record "receiver-on" and station, the second of the punches 62 being connected to the conductor 46 for punching a receiver mark at those times when the receiver segments are engaged by the wiper 35a and the first of the punches 62 being connected through a conductor 66 to the deenergized contact of the set of contacts 40 so as to punch a minute mark on the tape 63 during the interrogating pulse.

Figure 3:
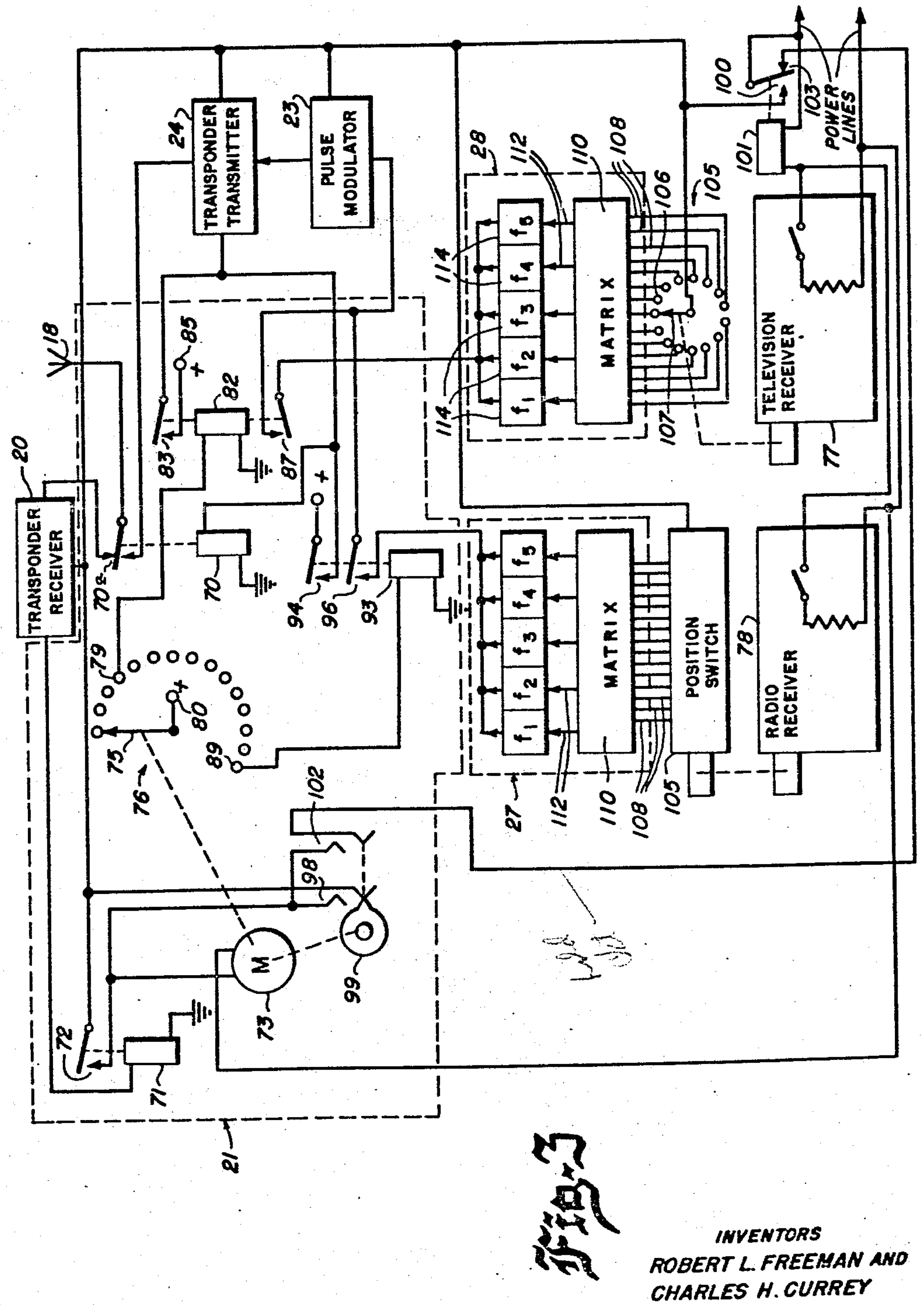
FIG. 3 is a circuit diagram, partially in block diagram form, of the equipment which is provided in each of the homes being monitored.

Refer now to FIG. 3, wherein is shown in greater detail the circuitry and associated equipment which is located in each of the homes being monitored. When the interrogation signal is received by the antenna system 18 it is coupled through a set of contacts 70*a* on a relay 70 to the receiver 20 which operates a relay 71 to close a set of contacts 72 thereof and thus to energize a drive motor 73. The motor 73 is mechanically connected to a wiper 75 of a two hundred forty segment rotary switch 76 to rotate it at a speed of one revolution per minute in synchronism with the switch 35 in the central office 10. Those ones of the segments on the switch 76 which correspond to the receivers in the associated home are used to energize the control unit 21 to cause transmission of the answering-back signal to the central office. Moreover, those segments which are associated with the television receivers in the home are located on that portion of the switch 76 which corresponds to the television segments in the switch 35 at the central office, and those segments which correspond to radio receivers in the home are located on that portion of the switch which corresponds to those segments of the switch 35 which pertain to radio receivers. Therefore, as the wiper 75 rotates in synchronism with the wiper 35*a* at the central office, it selectively and sequentially engages each of its two hundred forty segments until it engages a segment, designated 79, which is associated with a television receiver 77 in the home. During the time that the wiper 75 engages the open contacts, other homes in the sample are answering back. The home depicted in FIG. 3 includes two receivers, the television receiver 77 and a radio receiver 78, but it will be understood that a greater or lesser number of receivers can be associated with a single transpondor unit.

As shown, the wiper 75 is connected to a source of unidirectional voltage connected to a terminal 80, so that when the wiper 75 engages the segment 79, an answer-back relay 82 is energized to close normally open contacts 83 thereof to operate the relay 70 to connect the antenna 18 to the output of the transpondor transmitter 24. Closing of the contacts 83 connects a source of unidirectional voltage connected to the terminal 85 to the transmitter 24 thereby to key it into operation. Since the wiper 75 dwells on the segment 79 for slightly less than 0.25 second, the transmitter 24 is keyed on for slightly less than 0.25 second. In addition, another set of normally open contacts 87 on the relay 82 are closed at this time so as to couple the binary output signal from the coding unit 28 to the modulator 23. It may thus be seen that the transmitter 24 is keyed for operation when the wiper 75 engages the segment 79 and the coding unit 28, which is associated with the television receiver 77, is connected to the modulator 23 so that the signal transmitted from the transmitter 24 is modulated in accordance with the operating condition of the television receiver 77.

When the wiper 75 moves out of engagement with the segment 79, the transmitter 24 is rendered inoperative and the coding unit 28 is disconnected from the modulator 23. The wiper 75 then continues to rotate until it engages a segment 89 which is associated with the radio receiver 78. When the wiper 75 engages the segment 89, an answering-back relay 93 is operated to close a set of normally open contacts 94 thereon so as to key the answering transmitter 24 into operation. This also operates the relay 70 to connect the antenna 18 to the transmitter 24. Another set of normally open contacts 96 on the relay 93 are simultaneously closed to connect the output of the coding unit 27 to the modulator 23. In this manner the same modulator 23 and transpondor transmitter 24 are utilized for all of the receivers in any particular home, only separate coding units 27, 28 being necessary for each receiver.

Synchronization of the switches 76 in the homes with the switch 35 at the central office is provided by terminating the operation of the motors 73 after each cycle of operation until the interrogating pulse is received while the wiper 75 dwells at the first position. This is accomplished by the utilization of a switch 98 which supplies current to the motor 73 when the wiper 75 is in all but the first position. As shown, the motor 73 drives a cam 99 which opens the switch 98 when the wiper 75 is at the first position. When the wiper 75 is in the first position, however, the motor is energized through the contacts 72 if an interrogating signal is received. By proper selection of the cam surface 99 the time duration of the opening of the switch 98 is less than the period of interrogating pulse, thereby to insure proper synchronization and continuous operation of all of the motors in the system. Since, therefore, the interrogating signal from the central office must start the wiper 35*a* from the first segment 39, all of the switches 76 rotate in synchronism with the switch 35 and the origins of the answering-back signals may be readily identified by noting the markings on the tape 63 made by the second punch 62 of the recorder 32.

In order to cause the motor 73 to be operated only when one of the associated receivers is energized, a set of normally opened contacts 100 of a relay 101 is connected between one side of the power lines and the contacts 72. Since the coil of the relay 101 is connected in the power line to each of the monitored receiver circuits, the relay 101 is only energized when one of the receivers is energized. Also, in order to cause the switch 76 to stop at only the first position when the associated monitored receivers are deenergized, a switch 102, which is adapted to be operated in unison with the switch 98, is connected in series with a set of normally closed contacts 103 on the relay 101 and the motor 73 across the power lines. When, therefore, all of the receivers in the home are deenergized, motor 73 remains energized through the switch 102 until the wiper 75 reaches the first segment at which time switch 102 is opened by cam 99 and the motor 73 stops. Although a single relay 101 has been shown, it will be understood by those skilled in the art that it will be frequently desirable to employ a number of such relays, one for each receiver in the home, thereby to enable the use of the regular home wiring for conveying power to the receivers.

For the purpose of providing electrical signals which are related to the operating condition of each receiver in the sample, a plurality of position switches 105 are respectively connected to each receiver. The switches 105 may be of the rotary type having fifteen segments 106 and a wiper 107 which is electrically connected to the normally deenergized contact of the set of contacts 100 and mechanically connected to the tuning shaft of the receiver 77. The fifteen segments 106 are respectively connected through a plurality of conductors 108 to fifteen input terminals of a coding matrix 110. Some or all of the segments of the switch 105 thus respectively correspond to stations or channels to which the receiver 77 may be tuned, and the particular one of the segments 106 which is energized indicates the station which is tuned in. If desired, one of the conductors 108 may be energized whenever the receiver 77 is energized.

The coder units 27, 28 may comprise matrix units 110 of the type disclosed in the above-identified Currey patent, each of which units provide, on selected ones of five output conductors 112, a binary coded signal indicative of the particular one of the fifteen input terminals which is energized and whether or not the receiver is on. The conductors 112 are respectively connected to a plurality of oscillators 114 which are respectively tuned to different frequencies ranging, for example, from 400 to 2500 cycles per minute. The signals on the conductors 112 from the matrix 110 key on the oscillators 114 so that the signal which is transmitted from the transmitter 24 contains those frequency components which correspond to the particular ones of the conductors 112 which are energized, thereby to provide a binary coded transmittable signal representative of the operating condition of the receiver.

It may thus be seen that in the described embodiment of the present invention, two hundred thirty-five receivers are the maximum number of receivers that can be interrogated. It will be understood, however, that by utilizing switches having more than two hundred forty contacts a larger number of receivers may be interrogated since the primary limitation on the maximum number of receivers is determined by the precision with which the switches are constructed and driven.

An alternative method of interrogation, which may be employed in connection with the present system so as to eliminate the necessity for synchronizing the operation of the switches 35 and 76 in the central office and in the homes, utilizes a separate transpondor unit for each receiver in the sample rather than a single transpondor unit for each home in the sample. Inasmuch as there is generally more than one receiver in a home, it is apparent that in this system a larger number of transponder units are required to monitor the same number of receivers. Each of the transponder units in this alternative system is frequency selective so that each transpondor unit is responsive to an interrogating pulse modulated with a signal of unique frequency. The wiper of a rotary switch is rotated at a speed of one revolution per minute and each of the segments on the switch is so connected that when it is engaged by the wiper the interrogating pulse is modulated at a different frequency. This may be accomplished by a plurality of oscillators which are successively keyed on as the wiper sequentially engages the segments. The modulation frequency of the interrogating pulse may, for example have a frequency of the order of 10 megacycles when the wiper 35 of the switch is in the first position, a frequency of 10.1 megacycles when the wiper 35*a* is in the second position, etc. In such a case, one of the transpondor units would be responsive to an interrogating signal of 10 megacycles, another would be responsive to an interrogating signal of 10.1 megacycles, etc. This alternative arrangement thus eliminates the necessity of operating the switches at the central office and at the home in synchronism and also has the advantage that considerably larger samples may be handled by one central office since commutation precision in the switches is eliminated. As will be apparent to those skilled in the art, the commutator switch at the central office may be replaced by a high speed electronic type switch.

As indicated above, the individual receiver logs may be recorded by means of commercially available reperforating equipment which punches a tape in accordance with the ones of its solenoids which are energized. If, however, it is desired to monitor a larger number of homes than the commercially available reperforators can handle due to mechanical limits on the number of perforations per minute, it may be necessary to record the individual log information on a high speed recording media such as a magnetic tape. This system can easily be used to record this information on magnetic tape at a relatively high speed. To do so, the output of the filter units 58 in the detector 31 may be fed directly into the recording head of the recorder before detection of the received signal but the decoder 59 and totalizer 33 remain in the circuit so as to supply the printer 34 with minute-by-minute station totals. Moreover, it would be convenient to convert the minute mark signals from the relay 36 into a tone so that the minute mark is recorded on the magnetic tape as a separate frequency.

Another method of magnetic recording of the receiver operating condition information involves the sequential recording of a separate frequency and space for each minute mark and receiver position and simultaneously recording the frequencies representing the operating condition of the receiver. This simultaneous recording of all the information facilitates translating the information from the magnetic tape to punched cards for further computation of analysis data by the survey organization.

In the event that it is desirable to sample, from a single office, a considerably larger number of homes than heretofore considered, it becomes necessary to employ high speed interrogation. In order to interrogate the homes at a high speed, the system of FIGS. 2 and 3 may be employed with slight modification. The number of segments on the commutator switches or their electronic counterparts must have a larger number of switching positions so that the interrogating transmitter is keyed on more frequently and for much shorter periods such, for example, as for an overall period of 10 microseconds. Moreover, the interrogating transmitter is keyed on for 10 microseconds at the beginning of each receiver position instead of only once at the beginning of each minute. In this system, the transpondor units each employ a counter which counts the number of interrogating pulses which are received and each transpondor answers back after a respective predetermined number of such pulses have occurred. This entails the use of a counter at each transpondor unit, which counters may be electronic, electromagnet or electromechanical depending upon the particular circumstances and the installation. When each counter reaches a predermined count which is unique to the associated receiver, the associated transpondor transmitter is keyed on in the same manner as described above. Thus, as in the other alternative system, a unique delay for the response of each receiver is effected without the use of mechanical synchronization of the commutator switches. Moreover, the counters in the transpondor units can be reset by the transmission from the central office of a unique reset pulse at the beginning or end of each minute.

While there have been illustrated and described numerous embodiments of the present invention, it will be appreciated that various changes and modifications will occur to those skilled in the art, and it is aimed in the appended claim to cover all such changes and modifications which fall within the true spirit and scope of the present invention.

What is claimed as new and desired to be secured by Letters Patent of the United States is:

A system for monitoring the operation of a plurality of wave signal receivers from a central station geographically remote from said receivers, comprising a plurality of transponder units each connected to and controlled by one of said wave signal receivers, signal responsive means in each of said transponder units for receiving a signal from said central station, transmitting means in each of said transponder units for transmitting signals to said central station, switch means in each of said transponder units operable to different settings representing the tuning condition of the connected wave signal receiver, a plurality of normally inoperative generators of different frequency signals in each of said transponder units, continuously operable coding means controlled by said switch means for placing different combinations of said generators in operation to supply different output signals representing the different tuning conditions of the receiver, motor means in each of said transponder units, first means controlled by said motor means for connecting said coding means to said transmitting means, second means controlled by said motor means for placing said transmitting means in operation at a unique time in a reference time cycle representing the identity of the wave signal receiver, receiver means at said central station for receiving signals transmitted by said transponder units, means at said central station for transmitting an interrogating signal, a signal transmission channel connecting said central station to said transponder units, first switching means in each of said transponder units controlled by said motor means and normally connecting said signal responsive means to said transmission channel, and second switching means controlled by said signal responsive means and normally rendering said motor means ineffective, said second switching means being operated by the receipt of an interrogating signal from said channel by said signal responsive means for placing said motor means in operation to subsequently operate said first and second means and said first switching means at said unique time to disconnect said signal responsive means from said channel, to connect said transmitting means to said channel, and to connect the output signals then provided by said coding means to said transmitting means to transmit signals representing the tuning condition of the receiver to said receiving means at said central station.

References Cited in the file of this patent

UNITED STATES PATENTS

| | | |
|---|---|---|
| 2,047,900 | Bruckel | July 14, 1936 |
| 2,165,892 | Green et al. | July 11, 1939 |
| 2,249,324 | Potter | July 15, 1941 |
| 2,344,254 | Leathers et al. | Mar. 14, 1944 |
| 2,476,639 | Thomas | July 19, 1949 |
| 2,581,056 | Walmsley et al. | Jan. 1, 1952 |
| 2,643,172 | Reiss | June 23, 1953 |
| 2,658,942 | Durkee | Nov. 10, 1953 |
| 2,674,512 | Bogert | Apr. 6, 1954 |
| 2,701,279 | Lovell et al. | Feb. 1, 1955 |
| 2,719,284 | Roberts et al. | Sept. 27, 1955 |
| 2,755,161 | Rahmel | July 17, 1956 |
| 2,784,393 | Schultheis | Mar. 5, 1957 |
| 2,788,392 | Krahulec | Apr. 9, 1957 |
| 2,881,417 | Currey | Apr. 7, 1959 |

FOREIGN PATENTS

| | | |
|---|---|---|
| 738,800 | Great Britain | Oct. 19, 1955 |
| 514,998 | Germany | Dec. 20, 1930 |

OTHER REFERENCES

Electronics, April 1954, pp. 172–176 (Schultheis).